(12) United States Patent
Yogiashi (10) Patent No.: US 11,510,125 B2
(45) Date of Patent: Nov. 22, 2022

(54) COMMUNICATION SYSTEM, RELAY STATION, AND MOBILE STATION THAT PERFORM RELAY COMMUNICATION AND DIRECT COMMUNICATION

(71) Applicant: JVCKENWOOD Corporation, Kanagawa (JP)

(72) Inventor: Shun Yogiashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 79 days.

(21) Appl. No.: 16/937,709

(22) Filed: Jul. 24, 2020

(65) Prior Publication Data

US 2021/0029609 A1    Jan. 28, 2021

(30) Foreign Application Priority Data

Jul. 26, 2019   (JP) .............................. JP2019-137919

(51) Int. Cl.
*H04W 36/30* (2009.01)
*H04W 36/36* (2009.01)
*H04W 36/06* (2009.01)

(52) U.S. Cl.
CPC ........... *H04W 36/30* (2013.01); *H04W 36/06* (2013.01); *H04W 36/36* (2013.01)

(58) Field of Classification Search
CPC ..... H04W 36/30; H04W 36/06; H04W 36/36; H04W 36/03
See application file for complete search history.

(56) References Cited

U.S. PATENT DOCUMENTS

| 2015/0341107 A1* | 11/2015 | Hong | H04W 24/10 370/246 |
| 2019/0230631 A1* | 7/2019 | Zhao | H04W 72/0453 |
| 2020/0304200 A1* | 9/2020 | Ma | H04B 7/18519 |

FOREIGN PATENT DOCUMENTS

| CN | 105764061 A | * | 7/2016 | ............ H04W 16/04 |
| JP | 1997107583 A |   | 4/1997 | |

* cited by examiner

*Primary Examiner* — Charles N Appiah
*Assistant Examiner* — Frank E Donado
(74) *Attorney, Agent, or Firm* — Brundidge & Stanger, P.C.

(57) ABSTRACT

When a second mobile station detects quality deterioration of a signal received from a first mobile station at a second frequency, the second mobile station transmits a quality deterioration notification to a relay station at a first frequency. Upon receiving the quality deterioration notification, the relay station transmits a response at the second frequency to the second mobile station that has transmitted the quality deterioration notification, receives a signal from the first mobile station, and transmits the received signal to the second mobile station at the first frequency. Upon receiving the response from the relay station, the mobile station changes the communication mode so as to receive a signal that is from the first mobile station from the relay station.

5 Claims, 8 Drawing Sheets

COMMUNICATION SYSTEM, RELAY STATION, AND MOBILE STATION THAT PERFORM RELAY COMMUNICATION AND DIRECT COMMUNICATION

CROSS-REFERENCE TO RELATED APPLICATION

This application is based upon and claims the benefit of priority from the prior Japanese Patent Application No. 2019-137919, filed on Jul. 26, 2019, the entire contents of which is incorporated herein by reference.

BACKGROUND OF THE INVENTION

1. Field

The present invention relates to wireless communication technologies and particularly to a communication system, a relay station, and a mobile station that perform relay communication and direct communication.

2. Description of the Related Art

In a communication system in which two mobile stations communicate with each other via a relay station, switching to a mode is performed where the two mobile stations directly communicate with each other without using a relay station by using position information of the two mobile stations in order to effectively use resources (for example, see Patent Document 1).

[Patent Document 1] Japanese Patent Application Publication No. H9-107583

When two mobile stations communicate directly without going through a relay station, continuation of the communication becomes difficult when the distance between the two mobile stations becomes long due to the movement of at least one mobile station. In other words, the communication quality deteriorates. Even if the mobile station on the receiving side detects that the continuation of the communication becomes difficult, the mobile station cannot notify the mobile station on the transmitting side of such a situation. Further, when two mobile stations are directly communicating without going through a relay station, since the relay station does not manage the communication, the relay station cannot notify the mobile station on the transmitting side of the information indicating that the continuation of the communication is getting difficult. In this way, the continuation of the transmission of a signal by the mobile station on the transmitting side without knowing that the communication quality has deteriorated may result in a situation in which a speech sound on the transmitting side is not transmitted to the mobile station on the receiving side.

SUMMARY OF THE INVENTION

A communication system according to one aspect of the present embodiment includes a first mobile station, a relay station, and a second mobile station that are capable of performing communication using a first frequency and a second frequency that are different from each other. In the communication system in which the first mobile station and the second mobile station transmit and receive signals to/from each other at the second frequency in a direct communication mode, when the first mobile station detects quality deterioration of a signal received from the second mobile station, the first mobile station transmits a quality deterioration notification to the relay station at the first frequency, upon receiving the quality deterioration notification, the relay station transmits a response at the second frequency to the first mobile station that has transmitted the quality deterioration notification, receives a signal from the second mobile station, and transmits the received signal to the first mobile station at the first frequency, and upon receiving the response from the relay station, the first mobile station changes the communication mode so as to receive a signal that is from the second mobile station from the relay station.

Another aspect of the present embodiment also relates to a communication system. This communication system includes a first mobile station, a relay station, and a second mobile station that are capable of performing communication using a first frequency and a second frequency that are different from each other. In a direct communication mode, the second mobile station transmits a notification in the direct communication mode to the relay station at the first frequency and transmits a signal to the first mobile station at the second frequency. In the communication system in which the first mobile station receives a signal from the second mobile station at the second frequency, when receiving a notification in the direct communication mode from the second mobile station at the first frequency, the relay station receives a signal from the second mobile station at the second frequency and transmits the received signal to the first mobile station at the first frequency, and when detecting quality deterioration of a signal received from the second mobile station, the first mobile station changes the communication mode so as to receive a signal that is from the second mobile station from the relay station.

Still another aspect of the present embodiment relates to a relay station. This relay station is a relay station capable of using a first frequency and a second frequency that are different from each other, and includes: a communication interface that transmits to a first mobile station a signal received at the first frequency from a second mobile station set to a relay communication mode at the second frequency; and a controller that controls the communication interface. When the first mobile station and the second mobile station that are set to a direct communication mode are transmitting and receiving signals to/from each other at the second frequency, the controller, upon receiving a quality deterioration notification, changes the communication mode such that a signal from the second mobile station can be received at the second frequency after transmitting a response at the second frequency to the first mobile station that has transmitted the quality deterioration notification by controlling the communication interface, and transmits a signal received from the second mobile station at the first frequency.

Still another aspect of the present embodiment relates to a mobile station. This mobile station is a mobile station capable of using a first frequency and a second frequency that are different from each other, and includes: a communication interface that receives a signal transmitted at the second frequency from a mobile station on the transmitting side that is set to a direct communication mode; and a detector that detects quality deterioration of a signal received by the communication interface from the mobile station on the transmitting side in the direct communication mode. When quality deterioration is detected by the detector, the communication interface transmits a quality deterioration notification to a relay station at the first frequency, and upon receiving a response to the quality deterioration notification from the relay station, the communication interface changes the communication mode so as to receive a signal that is from the mobile station on the transmitting side from the relay station at the first frequency.

Optional combinations of the aforementioned constituting elements and implementations of the present embodiments in the form of methods, apparatuses, systems, recording mediums, and computer programs may also be practiced as additional modes of the present embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE PREFERRED EMBODIMENT

The invention will now be described by reference to the preferred embodiments. This does not intend to limit the scope of the present invention, but to exemplify the invention.

First Exemplary Embodiment

A brief description of the present invention will be given first before a specific description thereof is given. Exemplary embodiments of the present invention relate to a communication system including a relay station and a plurality of mobile stations. In the communication system, communication is performed while switching the mode to either a relay communication mode or a direct communication mode. In the relay communication mode, one mobile station (hereinafter referred to as "first mobile station") communicates with another mobile station (hereinafter referred to as "second mobile station") via a relay station. A first frequency is used for communication from a mobile station to the relay station, and a second frequency is used for communication from the relay station to a mobile station. That is, the relay station uses the first frequency as a reception frequency and the second frequency as a transmission frequency. In the direct communication mode, the first mobile station and the second mobile station communicate directly without going through the relay station. The second frequency is used for communication between the mobile stations. When the direct communication is performed, a signal transmitted from the first mobile station becomes difficult to be received by the second mobile station as the distance between the first mobile station and the second mobile station becomes longer, and the communication quality thus deteriorates. Therefore, suppression of deterioration of the communication quality is required.

When the second mobile station according to the present exemplary embodiment detects the quality deterioration of a signal received from the first mobile station, the second mobile station transmits a signal for indicating the quality deterioration (hereinafter, referred to as "quality deterioration notification") to the relay station using the first frequency. Upon receiving the quality deterioration notification, the relay station switches the transmission frequency and the reception frequency with each other after transmitting a response to the quality deterioration notification to the second mobile station using the second frequency. That is, the relay station uses the second frequency as the reception frequency and the first frequency as the transmission frequency. Upon receiving the response, the second mobile station switches the reception frequency from the second frequency to the first frequency. As a result, in the direct communication mode, the signal transmitted by the first mobile station using the second frequency is received by the relay station, and the relay station transmits the signal using the first frequency. Further, the second mobile station receives the signal from the relay station at the first frequency. The mode in which the relay station transmits at the first frequency a signal received at the second frequency in this way is called a provisional relay communication mode. In the provisional relay communication mode, the second mobile station receives a signal from the relay station at the first frequency.

Figure 1A:
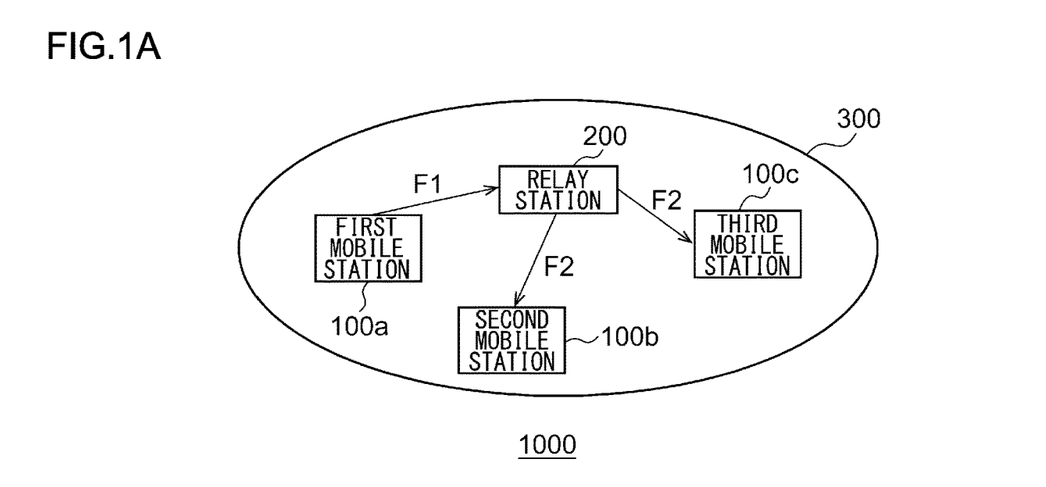
FIGS. 1A, 1B and 1C are diagrams showing a general outline of the operation of a communication system according to the first exemplary embodiment.
Figure 1B:
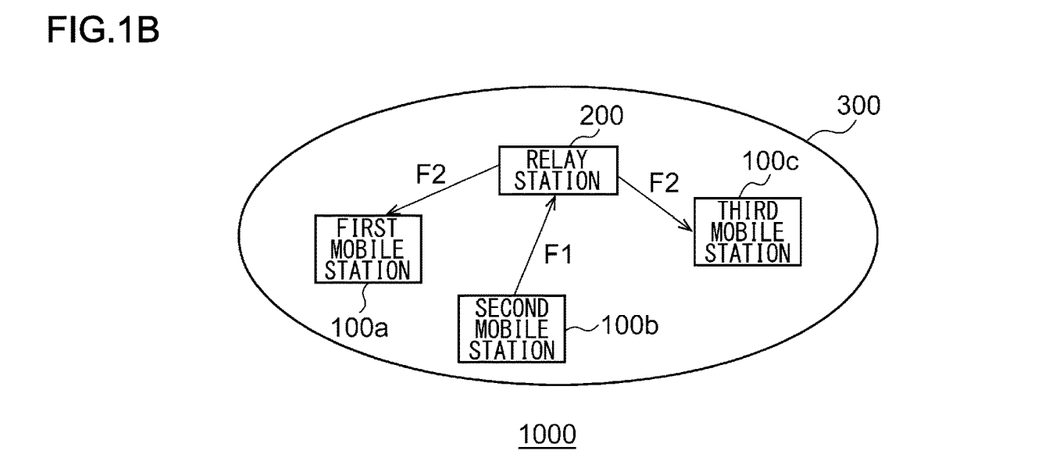
Figure 1C:
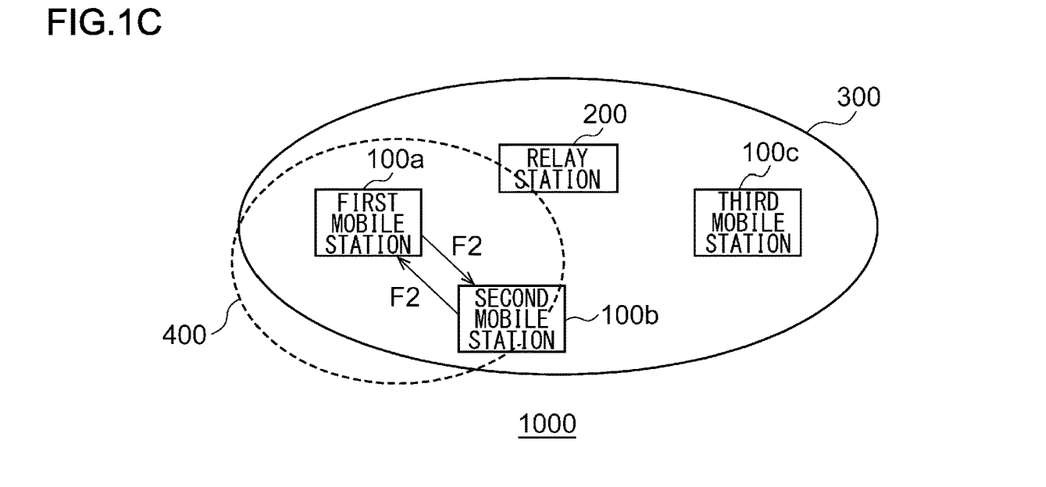

FIGS. 1A-1C show an outline of the operation of a communication system 1000. The communication system 1000 includes a first mobile station 100a, a second mobile station 100b, a third mobile station 100c, and a relay station 200, which are generically referred to as mobile stations 100. The number of mobile stations 100 included in the communication system 1000 is not limited to "3", and the number of relay stations 200 is not limited to "1". It is assumed that the communication system 1000 is, for example, a commercial radio and can use a first frequency F1 and a second frequency F2 different from each other. FIGS. 1A and 1B show an outline of the operation in the relay communication mode, and FIG. 1C shows an outline of the operation in the direct communication mode.

FIG. 1A shows a case where the first mobile station 100a is the mobile station 100 on the transmitting side. The communicable area of the relay station 200 is shown as a relay station communication area 300, and the first mobile station 100a through the third mobile station 100c exist inside the relay station communication area 300. Such a communication system 1000 supports, for example, Push-To-Talk (PTT). Depression of a PTT button of the first mobile station 100a set to the relay communication mode causes the first mobile station 100a to transmit a signal including a speech sound to the relay station 200 at the first frequency F1. The relay station 200 transmits the signal received from the first mobile station 100a at the first frequency F1 to the second mobile station 100b and the third mobile station 100c at the second frequency F2. The second mobile station 100b and the third mobile station 100c receive a signal from the relay station 200 at the second frequency F2 during a period when the PTT button is not depressed. The second mobile station 100b and the third mobile station 100c reproduce the speech sound included in the signal.

FIG. 1B shows a case where the second mobile station 100b is the mobile station 100 on the transmitting side. The second mobile station 100b set to the relay communication mode transmits a signal to the relay station 200 at the first frequency F1. The relay station 200 transmits the signal received from the second mobile station 100b at the first frequency F1 to the first mobile station 100a and the third mobile station 100c at the second frequency F2. The first mobile station 100a and the third mobile station 100c receive a signal from the relay station 200 at the second frequency F2. As described above, in the relay communication mode, the first frequency F1 is used as the transmission frequency in the mobile station 100 and the second frequency F2 is used as the reception frequency in the mobile station 100. Further, the second frequency F2 is used as the transmission frequency in the relay station 200, and the first frequency F1 is used as the reception frequency in the relay station 200.

In FIG. 1C, the communicable area of the first mobile station 100a is shown as a mobile station communication area 400, and the second mobile station 100b exists inside the mobile station communication area 400. In the following description, the third mobile station 100c will be omitted. The first mobile station 100a set to the direct communication mode transmits a signal to the second mobile station 100b at the second frequency F2, and the second mobile station 100b receives a signal from the first mobile station 100a at the second frequency F2. The second mobile station 100b, which has received the signal in the direct communication mode, is automatically set to the direct communication mode and transmits a signal to the first mobile station 100a at the second frequency F2, and the first mobile station 100a receives a signal from the second mobile station 100b at the frequency F2. As described above, in the direct communication mode, the second frequency F2 is used as the transmission frequency and the reception frequency in the mobile station 100.

Figure 2:
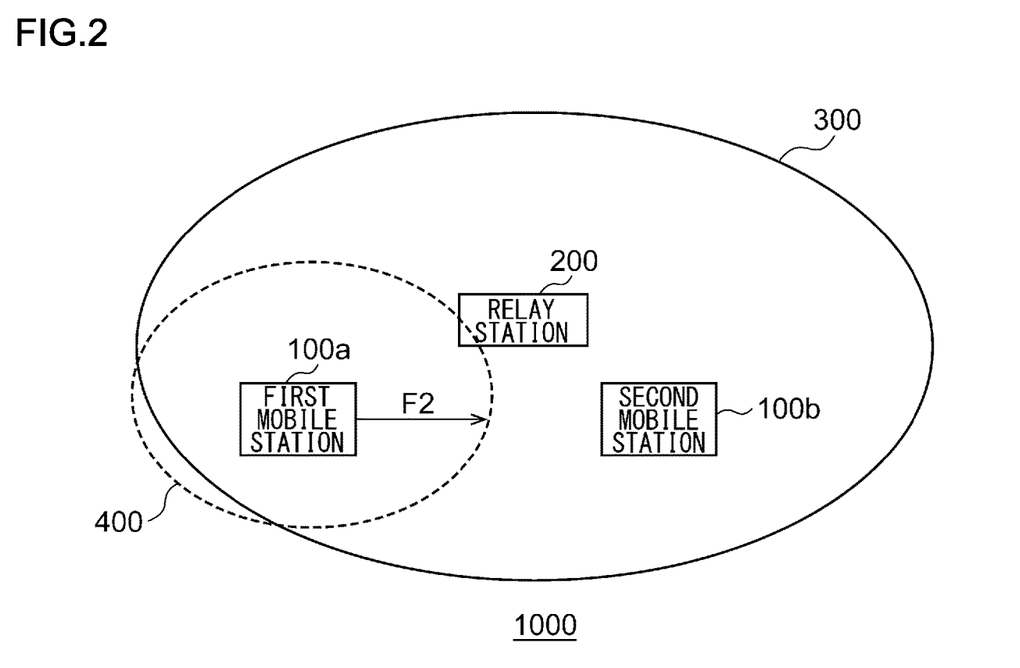
FIG. 2 is a diagram showing a problem in direct communication.

FIG. 2 shows a problem in direct communication. In the situation in FIG. 1C, when the second mobile station 100b moves in a direction away from the first mobile station 100a, the second mobile station 100b moves out of the mobile station communication area 400. As a result, the quality of the signal received by the second mobile station 100b from the first mobile station 100a deteriorates. An example of the deterioration of signal quality is deterioration of reception strength. Suppression of such deterioration of signal quality is required. The first mobile station 100a and the second mobile station 100b exist inside the relay station communication area 300.

Figure 3:
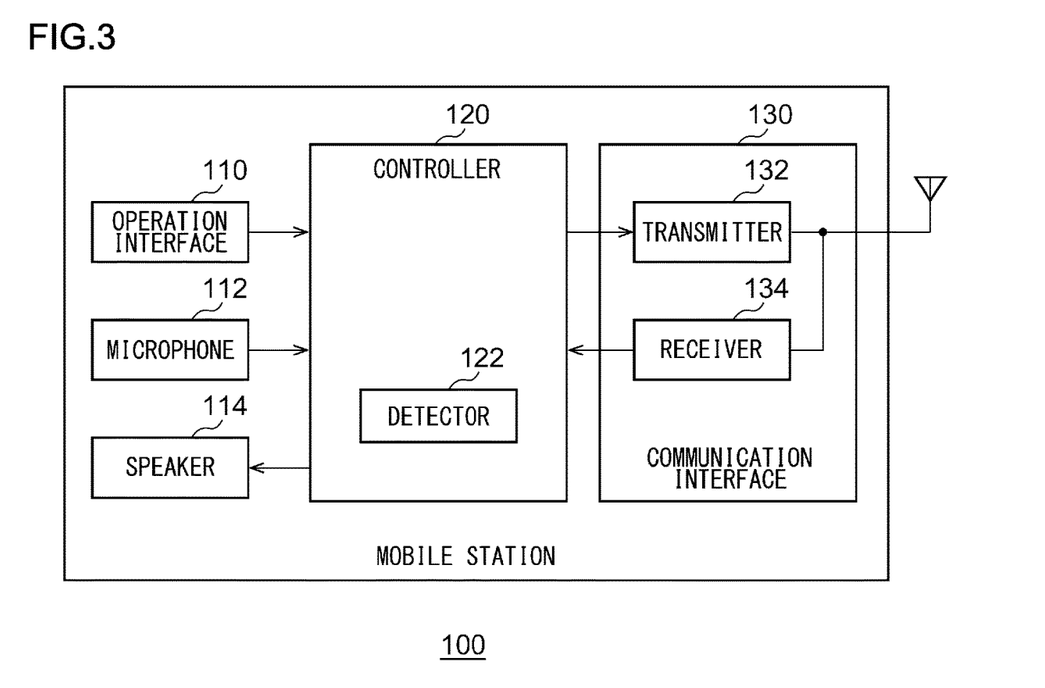
FIG. 3 is a diagram showing the configuration of a mobile station.

FIG. 3 shows the configuration of a mobile station 100. This corresponds to the first mobile station 100a through the third mobile station 100c in FIGS. 1A through 1C. A mobile station 100 includes an operation interface 110, a microphone 112, a speaker 114, a controller 120, and a communication interface 130. The controller 120 includes a detector 122, and the communication interface 130 includes a transmitter 132 and a receiver 134.

The operation interface 110 is an interface for accepting operations from the user. The operation interface 110 receives a mode setting for the mobile station 100. In the mode setting, the relay communication mode or the direct communication mode is selected. Further, the operation interface 110 includes operation buttons such as a PTT button. A PTT button in the mobile station 100 on the transmitting side is depressed by the caller to transmit a signal including a speech sound. On the other hand, a PTT button in the mobile station 100 on the receiving side cannot be depressed by the call receiver because a signal is not transmitted. Such an operation interface 110 may be a touch panel or the like and may not include a physical operation button.

The microphone 112 in the mobile station 100 on the transmitting side receives a speech sound originated by the caller. The microphone 112 converts the speech sound into an electrical signal and outputs the speech sound in the electrical signal (hereinafter, also referred to as "speech sound") to the controller 120. On the other hand, the controller 120 in the mobile station 100 on the receiving side reproduces the speech sound and outputs the speech sound to the speaker 114. The speaker 114 outputs the speech sound to the outside. The controller 120 controls the communication interface 130 to perform communication. The controller 120 in the mobile station 100 on the transmitting side outputs a signal including a speech sound to the transmitter 132. Further, the controller 120 in the mobile station 100 on the receiving side receives the signal including a speech sound through the receiver 134.

When the mobile station 100 is set to the relay communication mode, the transmitter 132 transmits the signal received through the controller 120 to the relay station 200 at the first frequency F1. Further, the receiver 134 receives a signal transmitted at the second frequency F2 from the relay station 200 that has received the signal transmitted at the first frequency F1 from another mobile station 100 set to the relay communication mode. The receiver 134 outputs the received signal to the controller 120. On the other hand, when the mobile station 100 is set to the direct communication mode, the transmitter 132 transmits the signal received through the controller 120 to the other mobile station 100 at the second frequency F2. Further, the receiver 134 receives a signal transmitted at the second frequency F2 from another mobile station 100 set to the direct communication mode. The receiver 134 outputs the received signal to the controller 120.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only or the combination of hardware and software.

Figure 4:
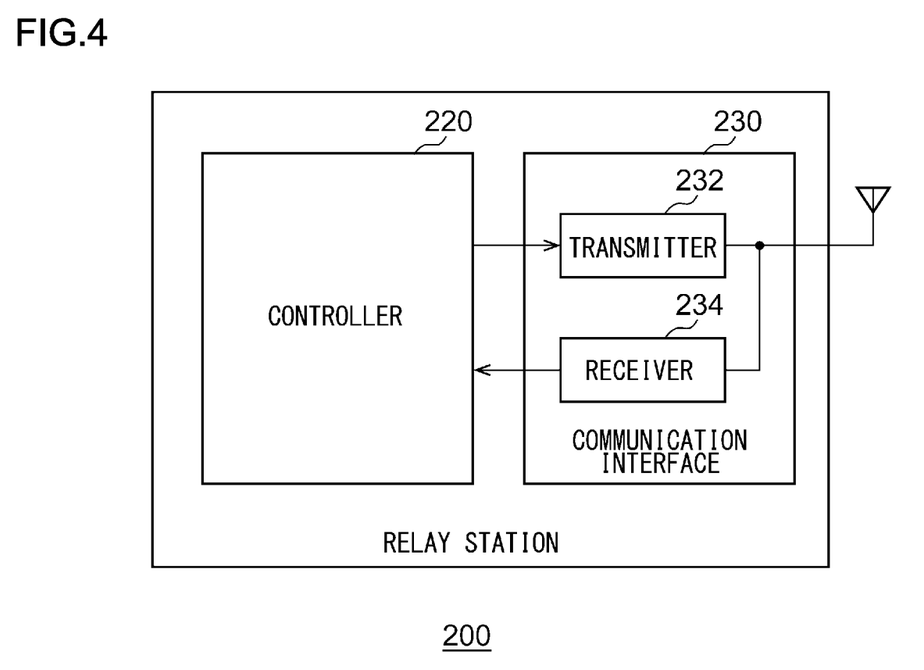
FIG. 4 is a diagram showing the configuration of a relay station.

FIG. 4 shows the configuration of a relay station 200. The relay station 200 includes a controller 220 and a communication interface 230, and the communication interface 230 includes a transmitter 232 and a receiver 234. The receiver 234 receives a signal at the first frequency F1 from the mobile station 100 on the transmitting side set to the relay communication mode. The receiver 234 outputs the received signal to the controller 220. The controller 220 controls the communication interface 230, and upon receiving a signal from the receiver 234, outputs the signal to the transmitter 232. The transmitter 232 transmits the signal received from the controller 220 to the mobile station 100 on the receiving side at the second frequency F2.

Figure 5A:
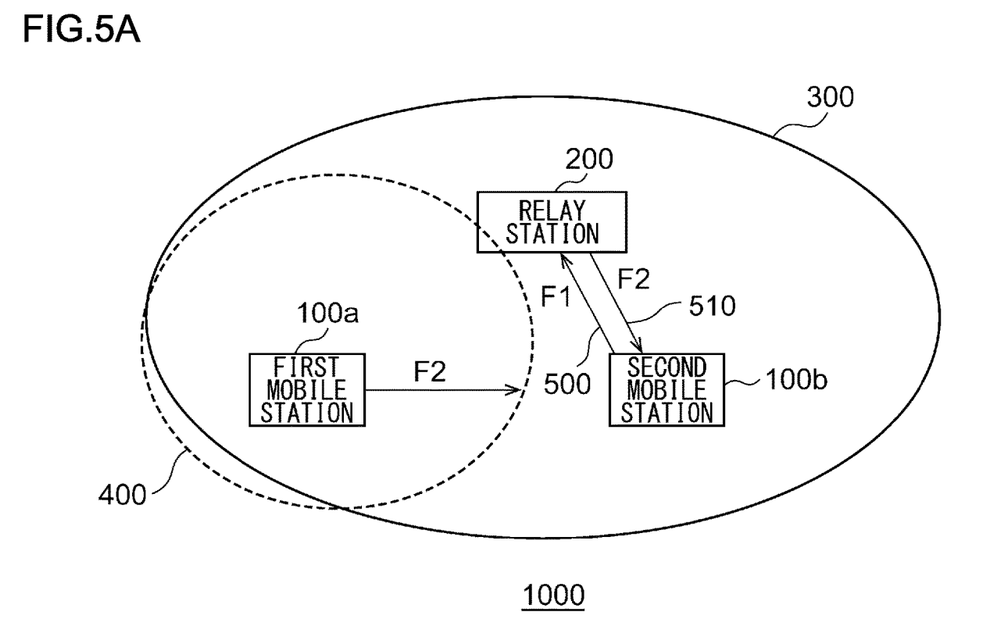
FIGS. 5A and 5B are diagrams showing a general outline of the operation of the communication system according to the first exemplary embodiment.
Figure 5B:
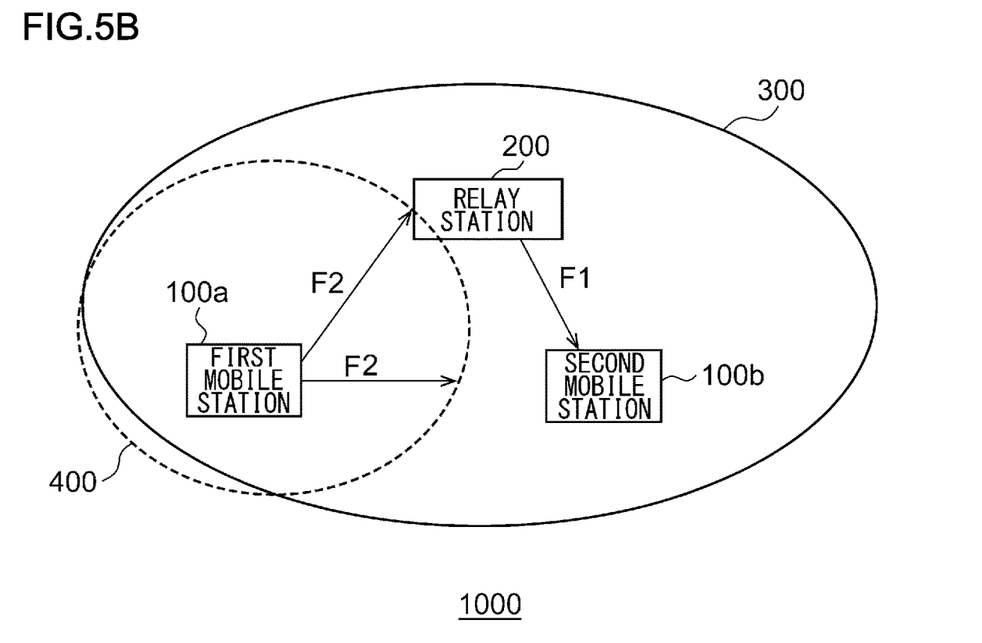

FIGS. 5A-5B show an outline of the operation of a communication system 1000. The arrangement of a first mobile station 100a, a second mobile station 100b, a relay station 200, a relay station communication area 300, and a mobile station communication area 400 in FIGS. 5A-5B is the same as that in FIG. 2.

In FIG. 5A, the detector 122 (FIG. 3) of the second mobile station 100b, which is the mobile station 100 on the receiving side, measures the quality of a signal received by the receiver 134, that is, a signal received at the second frequency F2 from the first mobile station 100a, which is the mobile station 100 on the transmitting side. As the quality of the signal, for example, a received signal strength indicator (RSSI), which represents the strength of the signal, is measured. The detector 122 detects quality deterioration of the signal when the RSSI becomes smaller than a threshold value. When the detector 122 detects the quality deterioration, the controller 120 sets the communication interface 130 to the relay communication mode and outputs a notification (hereinafter, referred to as "quality deterioration notification 500") for notifying the relay station 200 of the quality deterioration to the transmitter 132. The transmitter 132 transmits a quality deterioration notification 500 to the relay station 200 at the first frequency F1.

When the receiver 234 (FIG. 4) of the relay station 200 receives the quality deterioration notification 500 from the second mobile station 100b at the first frequency F1, the receiver 234 outputs the quality deterioration notification 500 to the controller 220. Upon receiving the quality deterioration notification 500 from the receiver 234, the controller 220 outputs a response 510 corresponding to the quality deterioration notification 500 to the transmitter 232. Upon receiving the response 510 from the controller 220, the transmitter 232 transmits the response 510 to the second mobile station 100b at the second frequency F2. The receiver 134 (FIG. 3) of the second mobile station 100b receives the response 510 from the relay station 200 at the second frequency F2. The receiver 134 outputs the response 510 to the controller 120. When receiving the response 510 from the receiver 134, the controller 120 (FIG. 3) of the second mobile station 100b switches the reception frequency at the receiver 134 from the second frequency F2 to the first frequency F1. As a result, the receiver 134 receives a signal from the relay station 200 at the first frequency F1.

In FIG. 5B, the controller 220 (FIG. 4) of the relay station 200 switches the frequency in the transmitter 232 and the frequency in the receiver 234 with each other after transmitting the response 510 from the transmitter 232. That is, the relay station 200 switches to the provisional relay communication mode. This corresponds to switching the transmission frequency and the reception frequency with each other. As a result, the receiver 234 receives a signal at the second frequency F2 from the first mobile station 100a set to the direct communication mode. The receiver 234 outputs the received signal to the controller 220. Upon receiving a signal from the receiver 234, the controller 220 outputs the signal to the transmitter 232. The transmitter 232 transmits the signal received from the controller 220 to the second mobile station 100b at the first frequency F1.

When the signal transmitted by the first mobile station 100a is received by the second mobile station 100b via the relay station 200 and the communication is ended, the relay station 200 and the second mobile station 100b change the transmission and reception frequencies back to their original frequencies. That is, the relay station 200 switches to the relay communication mode. Further, the relay station 200 transmits a notification indicating that direct communication between the first mobile station 100a and the second mobile station 100b cannot be performed (hereinafter, referred to as "out-of-range notification") at the second frequency F2 to the mobile station 100a. Upon receiving an out-of-range notification from the relay station 200, the first mobile station 100a uses the relay communication mode instead of the direct communication mode when transmitting a signal to the second mobile station 100b next time.

Figure 6:
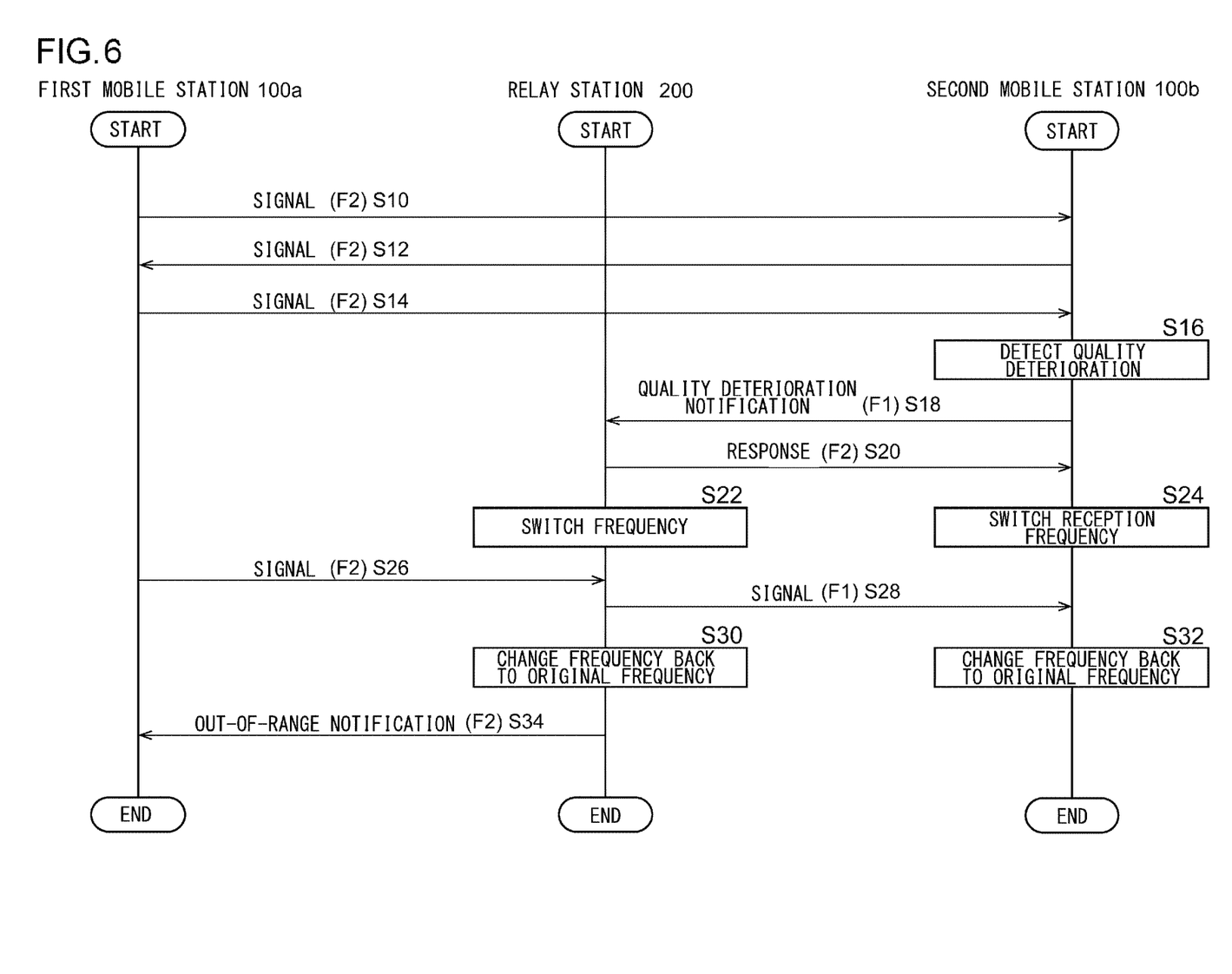
FIG. 6 is a sequence diagram showing steps of communication in the communication system according to the first exemplary embodiment.

An explanation will be given of the operation of the communication system 1000 having the above-stated structure. FIG. 6 is a sequence diagram showing steps of communication by the communication system 1000. The first mobile station 100a in the direct communication mode transmits a signal (second frequency F2) to the second mobile station 100b (S10). The second mobile station 100b transmits a signal (second frequency F2) to the first mobile station 100a (S12). The first mobile station 100a transmits a signal (second frequency F2) to the second mobile station 100b (S14). The second mobile station 100b detects quality deterioration of the received signal (S16). The second mobile station 100b transmits a quality deterioration notification 500 (first frequency F1) to the relay station 200 (S18). The relay station 200 transmits to the second mobile station 100b a response 510 (second frequency F2) to the quality deterioration notification 500 (S20). The relay station 200 switches the transmission frequency and the reception frequency with each other (S22). That is, the relay station 200 switches the frequencies so as to receive a signal at the second frequency F2 and transmit a signal at the first frequency F1. After receiving the response 510 (second frequency F2), the second mobile station 100b switches the reception frequency to the first frequency F1 (S24). The first mobile station 100a transmits a signal (second frequency F2) (S26), and the relay station 200 transmits a signal received at the second frequency F2 to the second mobile station 100b at the first frequency F1 (S28). When the transmission of the signal from the first mobile station 100a is ended, the relay station 200 changes the frequencies back to their original frequencies (S30), and the second mobile station 100b also changes the frequencies back to their original frequencies (S32). That is, the relay station 200 changes the frequencies back to their original frequencies so as to receive a signal at the first frequency F1 and transmit a signal at the second frequency F2, and the second mobile station 100b changes the frequencies back to their original frequencies so as to transmit a signal at the first frequency and receive a signal at the second frequency. The relay station 200 transmits an out-of-range notification (second frequency F2) to the first mobile station 100a (S34).

According to the present exemplary embodiment, when quality deterioration is detected in the mobile station on the receiving side, the relay station transmits a signal from the mobile station on the transmitting side to the mobile station on the receiving side by switching the transmission frequency and the reception frequency with each other. Thus, deterioration in communication quality can be suppressed even when the distance between the two mobile stations becomes long. Further, when the mobile station on the receiving side receives a signal from the relay station, since the mobile station on the transmitting side is notified that direct communication cannot be performed, the mobile station on the transmitting side can select the relay communication mode. Further, since the mobile station on the transmitting side selects the relay communication mode instead of the direct communication mode, deterioration in communication quality can be suppressed even when the distance between the two mobile stations becomes long. Also, when the quality deterioration of a signal from the mobile station on the transmitting side is detected, a signal from the relay station in which the transmission frequency and the reception frequency have been switched with each other is received by switching the reception frequency. Therefore, even when the distance between the two mobile stations becomes long, deterioration in communication quality can be suppressed.

Second Exemplary Embodiment

The second exemplary embodiment will be described next. The second exemplary embodiment relates to a communication system that is executed while switching between the relay communication mode and the direct communication mode is done as in the first exemplary embodiment, and a case is assumed where the distance between the first mobile station and the second mobile station becomes longer. In order to suppress deterioration in the communication quality in such a situation, the second mobile station transmits a quality deterioration notification to the relay station, and the relay station switches the transmission frequency and the reception frequency with each other in the first exemplary embodiment. On the other hand, in the second exemplary embodiment, when selecting the direct communication mode, the first mobile station transmits to the relay station a notification for indicating the execution of communication in the direct communication mode (hereinafter referred to as "direct communication notification"), and the relay station switches the transmission frequency and the reception frequency with each other. That is, the timing at which the relay station switches the transmission frequency and the reception frequency with each other is different between the first exemplary embodiment and the second exemplary embodiment. The communication system 1000 according to the second exemplary embodiment is of the same type as that in FIGS. 1A to 1C, the mobile station 100 is of the same type as that in FIG. 3, and the relay station 200 is of the same type as that in FIG. 4. An explanation will be made mainly regarding differences from the first exemplary embodiment.

Figure 7A:
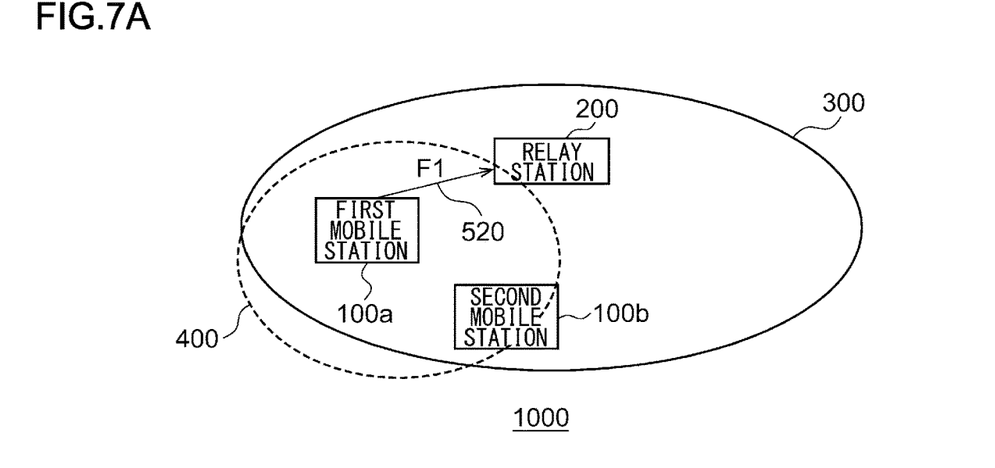
FIGS. 7A, 7B and 7C are diagrams showing a general outline of the operation of a communication system according to the second exemplary embodiment.
Figure 7B:
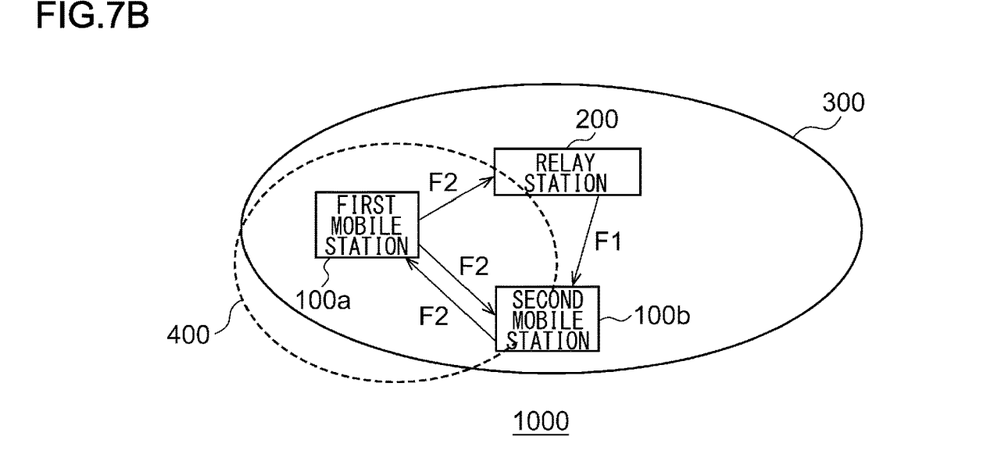
Figure 7C:
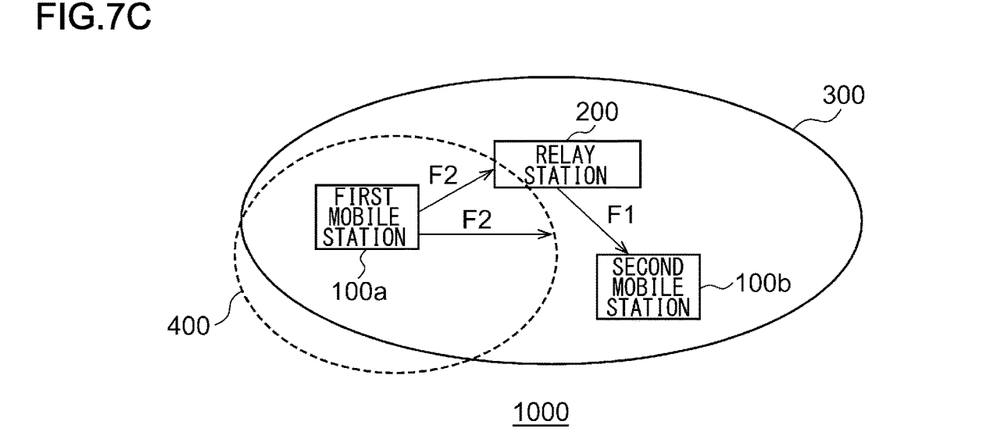

FIGS. 7A-7C show an outline of the operation of a communication system 1000. The arrangement of a first mobile station 100a, a relay station 200, a relay station communication area 300, and a mobile station communication area 400 in FIGS. 7A-7C is the same as that in FIG. 2. In FIG. 7A, the second mobile station 100b exists inside the mobile station communication area 400.

In FIG. 7A, the controller 120 (FIG. 3) of the first mobile station 100a, which is the mobile station 100 on the transmitting side, outputs a direct communication notification 520 to the transmitter 132 when switching to the direct communication mode is instructed through the operation interface 110. The transmitter 132 transmits the direct communication notification 520 to the relay station 200 at the first frequency F1. When the receiver 234 (FIG. 4) of the relay station 200 receives the direct communication notification 520 from the first mobile station 100a at the first frequency F1, the receiver 234 outputs the direct communication notification 520 to the controller 220.

In FIG. 7B, after transmitting the direct communication notification 520, the first mobile station 100a executes communication in the direct communication mode as in FIG. 1C. That is, the first mobile station 100a that has been set transmits a signal to the second mobile station 100b at the second frequency F2, and the second mobile station 100b receives a signal from the first mobile station 100a at the second frequency F2. The second mobile station 100b, which has received the signal in the direct communication mode, is automatically set to the direct communication mode and transmits a signal to the first mobile station 100a at the second frequency F2, and the first mobile station 100a receives a signal from the second mobile station 100b at the frequency F2.

Upon receiving the direct communication notification 520 from the receiver 234, the controller 220 (FIG. 4) of the relay station 200 switches the frequency in the transmitter 232 and the frequency in the receiver 234 with each other. This corresponds to switching the transmission frequency and the reception frequency with each other. As a result, the receiver 234 receives a signal at the second frequency F2 from the first mobile station 100a set to the direct communication mode. The receiver 234 outputs the received signal to the controller 220. Upon receiving a signal from the receiver 234, the controller 220 outputs the signal to the transmitter 232. The transmitter 232 transmits the signal received from the controller 220 to the second mobile station 100b at the first frequency F1.

In FIG. 7C, the second mobile station 100b is arranged in the same manner as in FIG. 2. The detector 122 (FIG. 3) of the second mobile station 100b measures, for example, RSSI as the quality of a signal received by the receiver 134, that is, a signal received at the second frequency F2 from the first mobile station 100a. The detector 122 detects quality deterioration of the signal when the RSSI becomes smaller than a threshold value. When the detector 122 detects the quality deterioration, the controller 120 switches the reception frequency in the receiver 134 from the second frequency F2 to the first frequency F1. As a result, the receiver 134 receives a signal from the relay station 200 at the first frequency F1.

Figure 8:
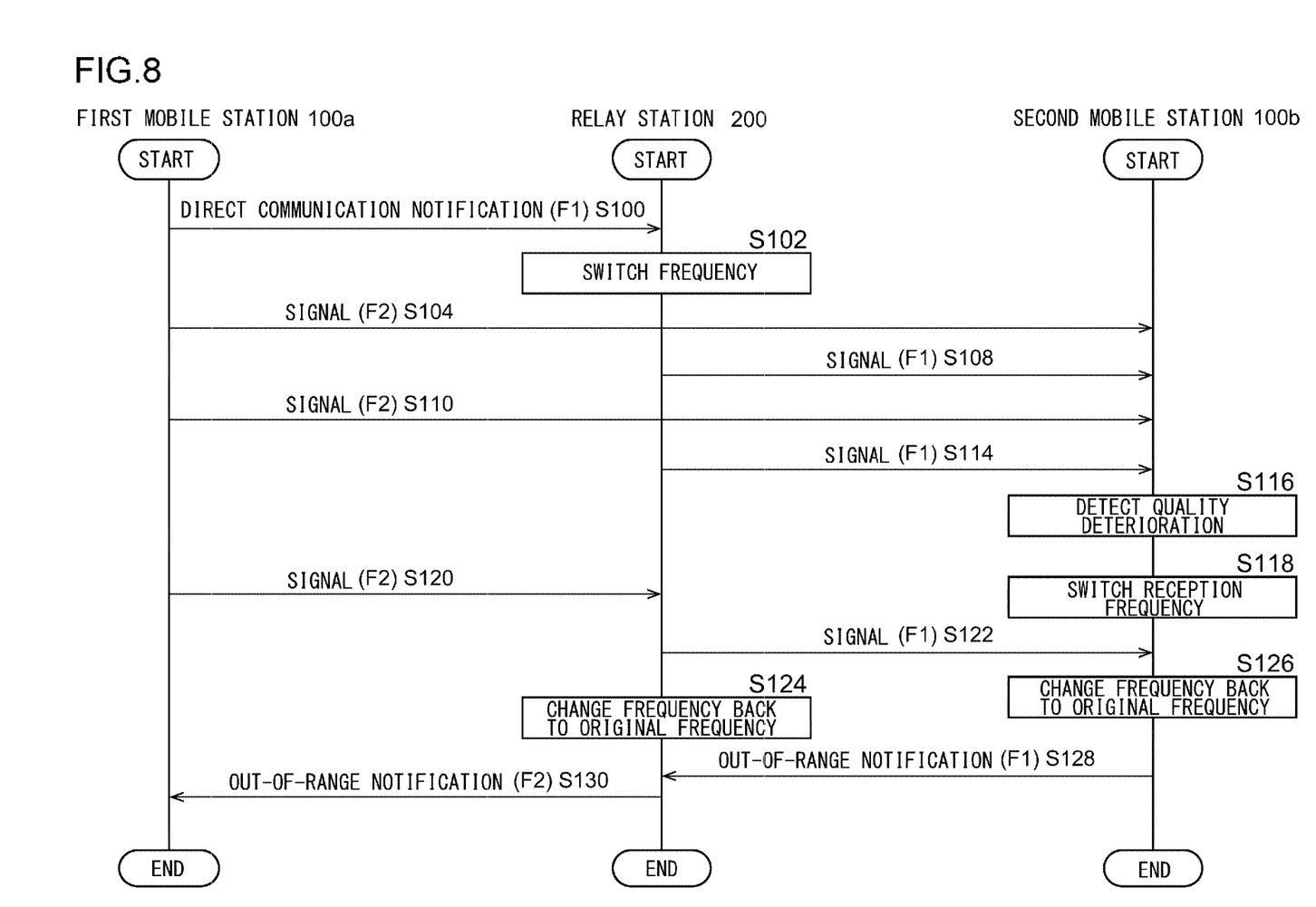
FIG. 8 is a sequence diagram showing steps of communication in the communication system according to the second exemplary embodiment.

FIG. 8 is a sequence diagram showing steps of communication by the communication system 1000. When instructed to switch to the direct communication mode, the first mobile station 100a transmits a direct communication notification 520 (first frequency F1) to the relay station 200 (S100). The relay station 200 switches the transmission frequency and the reception frequency with each other (S102). The first mobile station 100a transmits a signal (second frequency F2) to the second mobile station 100b (S104). The relay station 200 receives a signal (second frequency F2) from the first mobile station 100a and transmits a signal (first frequency F1) to the second mobile station 100b (S108). The second mobile station 100b receives a signal (second frequency F2) from the first mobile station 100a. The first mobile station 100a transmits a signal (second frequency F2) to the second mobile station 100b (S110). The relay station 200 receives a signal (second frequency F2) from the first mobile station 100a and transmits a signal (first frequency F1) to the second mobile station 100b (S114). At this time, the second mobile station 100b does not receive a signal transmitted from the relay station 200 at the first frequency F1 because the reception frequency is the second frequency F2.

The second mobile station 100b detects quality deterioration of a signal received from the first mobile station 100a (S116). The second mobile station 100b switches the reception frequency (S118). The first mobile station 100a transmits a signal (second frequency F2) (S120), and the relay station 200 transmits a signal (first frequency F1) to the second mobile station 100b (S122). The second mobile station 100b receives a signal (first frequency F1) from the relay station 200. When the transmission of the signal from the first mobile station 100a is ended, the relay station 200 changes the frequencies back to their original frequencies (S124), and the second mobile station 100b also changes the frequencies back to their original frequencies (S126). The second mobile station 100b transmits an out-of-range notification (first frequency F1) to the relay station 200 (S128), and the relay station 200 transmits an out-of-range notification (second frequency F2) to the first mobile station 100a (S130).

According to the present exemplary embodiment, when the mobile station on the transmitting side is set to the direct communication mode, by transmitting a direct communication notification to the relay station, the transmission frequency and the reception frequency at the relay station are switched with each other. Thus, the mobile station on the receiving side can receive a signal from the mobile station on the transmitting side by switching the reception frequency and can also receive a signal from the relay station. Further, since the mobile station on the receiving side receives a signal from the relay station by switching the reception frequency when the quality of a signal from the mobile station on the transmitting side deteriorates, even when the distance between the two mobile stations becomes long, it is possible to suppress a situation where a speech sound on the transmitting side is not transmitted to the mobile station on the receiving side due to deterioration of communication quality.

Described above is an explanation based on the exemplary embodiments of the present invention. These exemplary embodiments are intended to be illustrative only, and it will be obvious to those skilled in the art that various modifications to constituting elements and processes could be developed and that such modifications are also within the scope of the present invention.

What is claimed is:

1. A communication system, comprising:
a first mobile station and a second mobile station each including a transmitter that transmits a signal, a receiver that receives a signal, and a detector that detects quality deterioration of a signal; and
a relay station including a relay transmitter that transmits a signal and a relay receiver that receives a signal;
wherein the first mobile station, the second mobile station, and the relay station perform communication using a first frequency and a second frequency that are different from each other,
when the detector of the second mobile station detects, while the transmitter of the first mobile station is transmitting a signal at the second frequency in a direct communication mode in which the first mobile station and the second mobile station transmit and receive signals to/from each other in half-duplex communication, quality deterioration of a signal from the first mobile station that the receiver of the second mobile station receives, the transmitter of the second mobile station transmits a quality deterioration notification at the first frequency,
when the relay receiver receives the quality deterioration notification, the relay transmitter transmits a response at the second frequency, the relay receiver receives a signal that the first mobile station is transmitting at the second frequency, and the relay transmitter relays the signal of the first mobile station received and transmits the signal at the first frequency, and
when the receiver of the second mobile station receives the response, the receiver of the second mobile station changes a communication mode to receive the signal of the first mobile station that the relay station relays at the first frequency in place of the signal that the first mobile station is transmitting at the second frequency.

2. The communication system according to claim 1, wherein
the relay station has a relay communication mode for receiving a signal from the first mobile station at the first frequency and transmitting the received signal to the second mobile station at the second frequency and a provisional relay communication mode for receiving a signal from the first mobile station at the second frequency and transmitting the received signal to the second mobile station at the first frequency, and
when the relay station receives a signal from the first mobile station in the provisional relay communication mode and transmission of the received signal to the second mobile station has ended, the relay station switches to the relay communication mode.

3. The communication system according to claim 2, wherein
when switching from the provisional relay communication mode to the relay communication mode, the relay station notifies the first mobile station that direct communication between the second mobile station and the first mobile station cannot be performed.

4. A relay station capable of using a first frequency and a second frequency that are different from each other, comprising:
a communication interface that relays and transmits to a second mobile station a signal received at the first frequency from a first mobile station, when the relay station is set to a relay communication mode, the signal transmitted to the second mobile station at the second frequency; and
a controller that controls the communication interface,
wherein when the controller receives a quality deterioration notification from the second mobile station while the first mobile station set to a direct communication mode of half-duplex communication is transmitting a signal to the second mobile station at the second frequency, the controller controls the communication interface to change a communication mode to transmit a response to the second mobile station, which has transmitted the quality deterioration notification, at the second frequency, to receive a signal from the first mobile station at the second frequency, and to relay and transmit a signal from the first mobile station at the first frequency.

5. A mobile station that uses a first frequency and a second frequency that are different from each other to perform half-duplex communication, comprising:
a communication interface that receives a signal transmitted at the second frequency from another mobile station on a transmitting side that is set to a direct communication mode of half-duplex communication; and
a detector that detects quality deterioration of a signal received by the communication interface from the another mobile station on the transmitting side in the direct communication mode of half-duplex communication when the signal is transmitted at the second frequency,
wherein when the quality deterioration is detected by the detector, the communication interface transmits a quality deterioration notification to a relay station at the first frequency, and
upon receiving a response to the quality deterioration notification from the relay station at the second frequency, the communication interface changes the communication mode so as to receive a signal transmitted from the relay station at the first frequency in place of a signal that is transmitted from the another mobile station on the transmitting side at the second frequency.

\* \* \* \* \*